(12) United States Patent
Kirby (10) Patent No.: US 6,526,478 B1
(45) Date of Patent: Feb. 25, 2003

(54) RAID LUN CREATION USING PROPORTIONAL DISK MAPPING

(75) Inventor: Jay W. Kirby, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/496,031

(22) Filed: Feb. 2, 2000

(51) Int. Cl.$^7$ ............................................... G06F 12/02
(52) U.S. Cl. ........................ 711/114; 711/171; 711/209
(58) Field of Search ................................. 711/114, 202, 711/203, 209, 171, 173; 714/5, 6, 7; 710/5

(56) References Cited

U.S. PATENT DOCUMENTS

| | | | | |
|---|---|---|---|---|
| 5,542,064 A | * | 7/1996 | Tanaka et al. ............... | 711/114 |
| 5,606,681 A | * | 2/1997 | Smith et al. ................. | 711/203 |
| 5,689,678 A | * | 11/1997 | Stallmo et al. .............. | 711/114 |
| 5,696,934 A | * | 12/1997 | Jacobson et al. ............. | 714/5 |
| 5,754,756 A | * | 5/1998 | Watanabe et al. ............. | 714/6 |
| 5,845,319 A | * | 12/1998 | Yorimitsu ................... | 711/114 |
| 6,148,369 A | * | 11/2000 | Ofer et al. .................. | 711/114 |

OTHER PUBLICATIONS

Massiglia, Paul, "The RAID Book", 6th Edition, Feb., 1997, pp. 8–11, 40–41, and 55–82.*

* cited by examiner

Primary Examiner—Gary J Portka
(74) Attorney, Agent, or Firm—Cochran & Collins, LLP (57) ABSTRACT

A method and system for creating logical units (LUNs) in a RAID system by allocating proportional amounts of disk storage space to each LUN. Proportional allocation of disk space for different LUNs allows for the selective mapping of more data from the LUN to be mapped to some of the different disks to better optimize the I/O performance in a RAID system. The LUN is divided into a plurality segments or strips are allocated to predetermined disks in a predetermined proportional manner. A proportional create statement defines the proportional mapping and an intelligent RAID controller manages the proportional mapping of information.

9 Claims, 6 Drawing Sheets

RAID LUN CREATION USING PROPORTIONAL DISK MAPPING

FIELD OF THE INVENTION

The present invention relates to redundant array of independent disk systems (RAID). More particularly the present invention relates to the creation of Logical Units (LUNs) in a RAID system and the mapping of information to the various RAID system disks.

BACKGROUND OF THE INVENTION

RAID disk subsystems organize multiple disks into arrays, which appear to host applications as one or more virtual disks or LUNs. The RAID systems have historically provided extensive error recovery capabilities, including both ample disk storage space and the algorithms to maintain high degrees of data integrity and consistency. Moreover, in many situations RAID systems have also provided increased input/output (I/O) performance as multiple disks typically supply more information to a microprocessor in a shorter period of time than a single disk system.

The placement of files on the physical disks depends on the characteristics of the particular LUN for that file. That is, each file is associated with a LUN and each LUN is allocated different physical disk storage space. For example, during creation, a LUN may be allocated only one physical disk, and in that case, any file for that LUN is mapped only to the one physical disk. If a LUN is created to utilize two disks, then files may be mapped to either or both of the two disks. Typically, the disks in a RAID system are divided into logical blocks or segments. Each LUN is allocated a predetermined number of these segments. Although the segments may be physically located on different physical disks, the combination of segments related to a LUN, sometimes referred to as a virtual volume, appear to a host computer as a contiguous set of memory addresses as if each segment was on the same disk.

Typically, RAID algorithms provide redundant data to the array through the use of "mapping," or distributing of both user data and redundant information across the available storage space. The redundant information may be an exact copy of the user data or error correcting code information derived from the user data. The redundant information may then be used at a later time to regenerate lost or corrupted information. RAID systems typically employ advanced RAID controllers to handle these functions.

Additionally, the RAID controllers may provide control for different RAID levels within one system for different LUNs and for isolation of different LUNs on separate physical disks. For example, some applications continuously update a "redo" file, which is essentially a log of activity that can be used to regenerate lost information. As the redo file essentially provides secondary backup capabilities, it is typically stored using a RAID one level algorithm. Importantly, however, the LUN used for storing the redo file is typically kept separate from other LUNs that may also store other redo files. Similarly, archive files are also typically placed on separate disks from one another, and therefore different LUNs that use different physical disks are created for these files to keep the files separate.

The user information is typically stored in other groups of disks that generally provide some upper level of RAID having redundancy. As an example, if a data file is stored in one group of disks using a striping algorithm at RAID five level, then the file is divided into sections of a predetermined size, and each disk receives one or more of the sections. An extra disk receives redundant or parity information to provide for error recovery. For a particularly large file, there may be many "stripes" of information across the group of disks. Specific LUNs are typically created for user information. These LUNs may be created to allow for allocation of disk space on the same disks as those disks used for the redo and archive files. Alternatively the LUNs may be created to use disk space from other disks within the RAID system. Importantly, the process of creating the LUN allows for the selection of physical disks that will eventually provide storage space.

During the operation of a host application, certain files tend to be accessed more often than other files. For example, user information relating to indexes and tables for database applications tend to be accessed much more often than the redo or the archive log files within the database. Indeed, database administrators (DBAs) often use software tools to track the usage of particular files and the number of hits per disk which often leads to the determination that a particular group of disks is being hit more often then others. Once this determination is made, a LUN is often recreated, allocating different physical disk space for that LUN in an attempt to even the number of hits per disk. Typically, if the various disks are being accessed at the same rates, i.e., having the same number of hits per disk then the performance improves significantly. That is, since each disk has a characteristic I/O rate at which it can write and read information to and from a disk, then ideally, the optimal performance occurs when all disks are operating at their highest I/O rate.

Although recreating a LUN to even the hits per disk provides for increased performance, optimal performance is typically not achieved using this method due to one drawback. The way in which LUNs are created provides for a create statement that indicates the desired disks to be used and the amount of space to allocate. The RAID controller then allocates the same amount of disk space for each of the indicated disks to achieve the desired amount. If a higher level of RAID is indicated then disk space is allocated for the redundant information on one or all of the indicated disks. Importantly each of the indicated disks provides equal amounts of space for that LUN. Consequently however, since not all LUNs are divided equally among all disks, dividing a single LUN equally among the indicated disks does not provide for optimal performance.

As an example, assume LUN-1 is created to use three out of eight disks in a RAID system, and the files in this LUN receive sixty percent of the hits during operation. Also assume LUN-2 and LUN-3 have been created to use the other five disks and these files receive forty percent of the hits during operation. For the purposes of this example, assume that the LUN-2 and LUN-3 can not share disk space. Recreating LUN-1 to use all eight disks effectively spreads sixty percent of the hits across all eight disks, but does not optimize performance because five disks will receive fifteen and one half percent of the hits whereas the other three disks only receive seven and one half percent of the hits. Since three disks are operating at approximately one-half the rate of the other disks, optimal performance has not been achieved.

It is with respect to these considerations and others that the present invention has been made.

SUMMARY OF THE INVENTION

The above described difficulties encountered with conventional systems are overcome by the present invention by providing a high level control system that selectively creates logical units (LUNs), allocating proportional amounts of disk storage space to each disk used by the LUN. Proportional allocation of disk space for different LUNs allows for the selective mapping of more data from the LUN to be mapped to some of the different disks to better optimize the I/O performance in a RAID system.

In accordance with preferred aspects, the present invention relates to a method of creating a logical unit in a redundant array of independent disks (RAID) system by first dividing the logical unit into a plurality segments, allocating segments to a set of disks, and then allocating additional segments to a second set of one or more disks, where the second set of disks is a subset of the first set of disks, such that the second set of disks is allocated more segments than the first set of disks. The method involves the receipt of a proportional create statement wherein the create statement comprises a parameter list of disks and the number of segments to be allocated to each disk for each group. The method may also involve the parsing of the create statement to determine a group size value and a group members value. Additionally, the method involves generating a table that associates the physical disk for each segment to its corresponding logical address of the LUN. The table is then used to access data in the logical unit.

In accordance with other preferred aspects, the present invention relates to a method of improving the performance of a RAID system wherein the system has at least one logical unit that has been allocated disk space on less than all of disks, the method involving the analysis of the utilization of the plurality of disks, the determination of available disk space, the determination as to whether the available disk space can contain new information, and the creation of a new logical unit using proportional mapping. The creation of a new logical unit allocates at least some information from the new logical unit to the disks previously determined to have available space and at least one disk is allocated more segments for the new logical unit than another disk having at least one segment for the new logical unit. The method also includes the creation of a conversion memory map for converting logical block addresses to physical addresses.

In accordance with yet other aspects, the present invention relates to a RAID system having a plurality of physical disks forming an array, a controller connected to the array of disks for controlling the allocation of data on the physical disks and a host computer system connected to the controller. The information on the array is presented to the host computer system as one or more virtual disks and information in the virtual disk is proportionally mapped to the array. With respect to preferred aspects, the module comprises a computer program of instructions for executing a computer process for proportionally mapping at least one virtual disk to the array. Additionally, the controller further comprises a computer readable medium for storing the module and a microprocessor for executing the computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

The embodiments of the invention described herein are implemented as logical steps in one or more computer systems. The logical steps of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, or modules.

Figure 1:
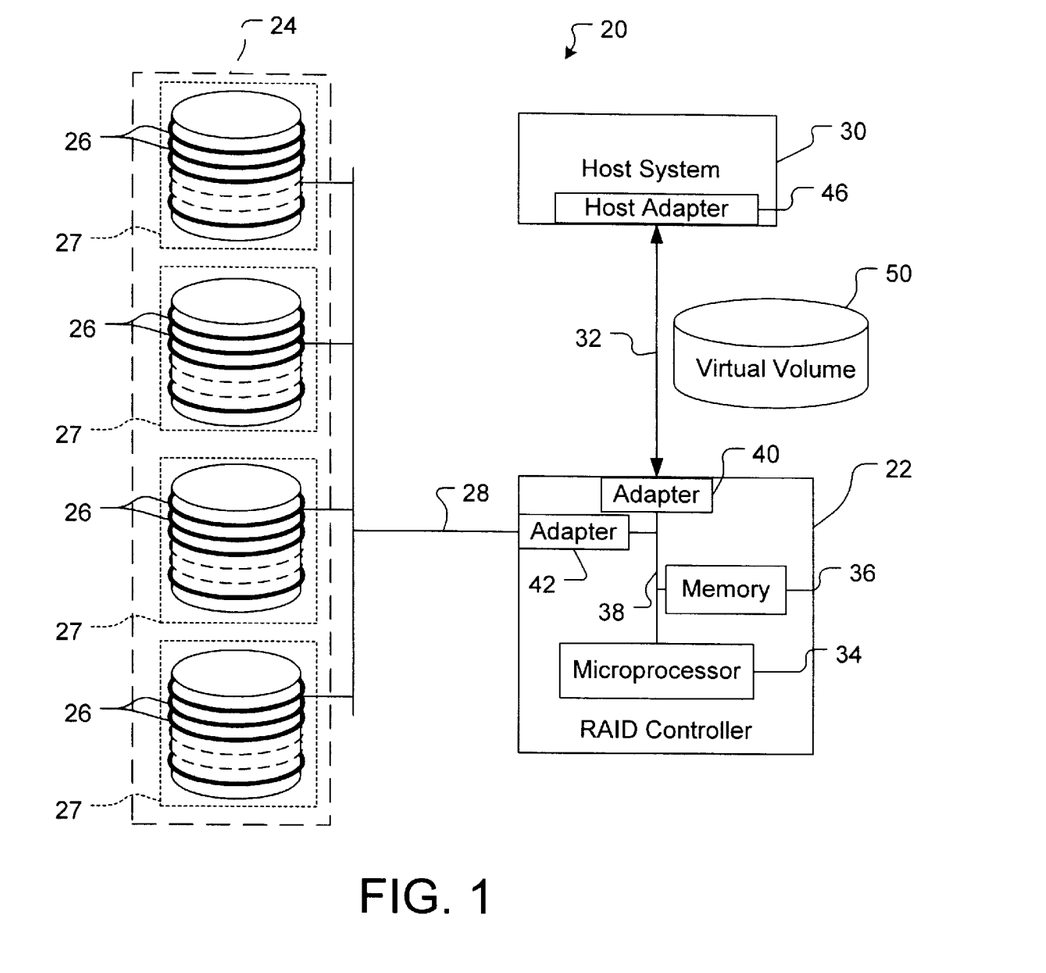
FIG. 1 is a block diagram of a RAID system incorporating the present invention, wherein the RAID system provides a host computer a virtual volume representing storage space on an array of physical disks.

A RAID system 20 incorporating a RAID controller 22 and an array 24 of independent disks 26 is shown in FIG. 1. The disks 26 are separated into groups 27 of disks wherein each group can be accessed by a separate channel. The RAID controller 22 operates in accordance with the present invention to selectively map data to one group 27 of disks 26 shown in FIG. 1. The RAID controller 22 is connected to the array 24 by way of one or more communications cables such as cable 28. The RAID controller 22 is also connected to a host computer 30, which facilitates user control of the RAID controller 22. The host computer 30 is connected to the RAID controller 22 by way of a link 32.

The RAID controller comprises a microprocessor 34 and memory 36. The memory and the microprocessor are connected by a controller bus 38 and operate to control the mapping algorithms for the disk array 24. The RAID controller 22 communicates with the host computer system through an adapter 40, which is connected to link 32. The controller 22 similarly communicates with the disk array 24 through adapter 42, which is connected to cable 28. In one embodiment, the adapters 40 and 42 are Small Computer System Interface (SCSI) adapters.

The disk array 24 shown in FIG. 1 is a collection of disks 26 which are relatively independent storage elements, capable of controlling their own operation and responding to input/output (I/O) commands autonomously, which is a relatively common capability of modern disks. The particular disks 26 may be either magnetic or optical disks and are capable of data conversion, device control, error recovery, and bus arbitration; i.e., they are intelligent storage elements similar to those commonly found in personal computers, workstations and small servers. The disks 26 further provide block-addressable random read/write access to data storage. Although the disks 26 may be specially adapted for use in arrays, e.g., requiring that the disks be rotationally synchronized, the preferred embodiment utilizes general purpose disks which are more commonly used for striped and mirrored arrays.

Data is transferred to and from the disk array 24 via cable 28. The cable 28 essentially moves commands, disk responses and data between the I/O bus adapter 42 and the disk array 24. In an embodiment, the cable 28 represents one or more channels comprising one or more SCSI buses. Alternatively, the cable 28 may be a collection of channels that use some other technology, e.g., an IDE based bus system.

The host computer 30 provides host software access to the RAID controller so that commands can be executed in accordance with predetermined RAID algorithms. The host computer 30 executes applications, such as online database or transaction applications. The host uses I/O driver software to communicate application requests to the link 32 through the host adapter 46. Moreover the host 30 contains the main memory (not shown) that is the destination for data read from disks 26 and the source for data written to the disks 26. The services of a database administrator (DBA) are generally used at the host computer 30 to provide more specific control over the actual allocation and placement of data or files in a database that is stored on the disks 26.

The adapter 46 provides an interface between the memory on the host 30 and the link 32. The host adapter 46 accepts commands from the I/O driver, translates them as necessary, and relays them to the RAID controller 22 using the link 32. Further, the host adapter receives information from the RAID controller 32 and forwards that information on to host memory for host processing. Similarly, adapters 40 and 42 located in the RAID controller 22 perform many of the same functions as the adapter 46 in terms of communicating commands and data between links 32 and 28 and the memory 36 respectively in the RAID controller 22.

In alternative embodiments, the RAID controller 22 shown in FIG. 1 may be incorporated into the host computer system 30. However, the RAID controller 22 is shown separately here and represents an intelligent controller, which is interposed between the host adapter 46 and the disks 26. In this configuration, the intelligent. controller facilitates the connection of larger numbers of disks and other storage devices to the host computers 30. Moreover, intelligent controllers such as controller 22 typically provide communication with a higher capacity I/O bus cable 28 than normally available with non-intelligent controllers. Therefore, I/O system data transfer capacity is generally much larger with an intermediate intelligent controller such as the RAID controller 22 shown in FIG. 1.

The controller 22 communicates with the separate groups 27 of disks 26 via channels. Some channels are functionally identical to the I/O bus connecting the host computer 30 and the controller 22. Other channels are intelligent enough in their own right to accept sequences of I/O commands called scripts and execute them autonomously, i.e., with less assistance from the host 30 or the controller 32. The controller 22 incorporates multiple channels (not shown), and accepts host I/O requests addressed to disks and routes them to the channels to which the address disks are connected. Thus, in system 20, the controller 22 provides host 30 with additional disk connectivity by allowing the host 30 to connect to more disks 26 than the I/O bus 28 alone may accommodate, while providing greater I/O performance capacity because it provides access to more I/O resources, disks and buses, across which the host computer's I/O load can be spread. Moreover, the controller 22 also assists in scheduling and processing I/O requests thereby freeing some host computer capacity for application processing.

Figure 2:
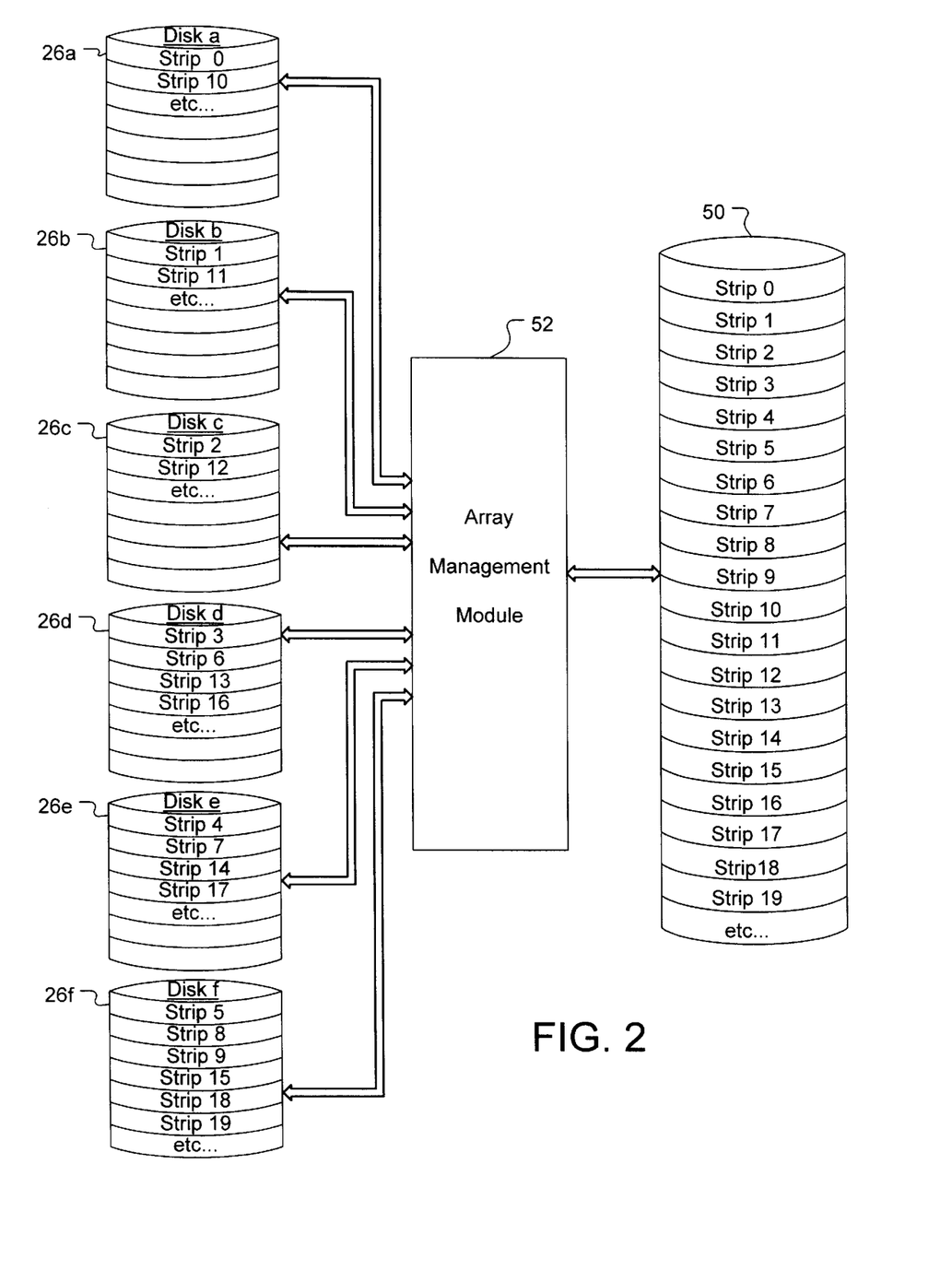
FIG. 2 is a representation of the mapping of strip segments of the virtual volume shown in FIG. 1 to the physical disks shown in FIG. 1.

The disk array 24 comprises storage disks 26 that are managed by an array management module 52 as shown in FIG. 2. The array management module 52, in a preferred embodiment, comprises software executing on the RAID controller 22 (FIG. 1). One function of the array management module 52 is to represent information on the disks 26 to the host computer 30 as at least one virtual disk, such as virtual disk volume 50 (FIGS. 1 and 2). The virtual disk 50 is also referred to herein as a logical unit, wherein the logical unit may be identified by a logical unit number (LUN). During its creation, the space available for the LUN 50 is logically divided into a number equally sized segments or strips. These strips are then proportionally mapped to the various disks 26.

The module 52 (FIG. 2) represents information as part of a LUN to the host 30 as a series of segments or strips that are contiguous set of logical addresses, referred to as logical block addresses (LBAs). Consequently, the host 30 need only be concerned with continuous addresses as if there was only one physical disk containing the LUN information. One of the functions of module 52 is to actually map the LUN information from the LBAs to physical member disk data addresses, wherein non-contiguous disks and disk space is used. As stated, in the embodiment shown in FIG. 1, the array management module 52 (FIG. 2) executes on the RAID controller 22, but in alternative embodiments, other processors, such as the host processor (not shown), may provide module 52 functions.

The module 52 of the present invention maps information from LUN 50 to disks 26 in predefined proportional manner, as shown in FIG. 2. At the time LUN 50 is created, disk space is allocated to the LUN in segments or strips. Although the strips appear to the host as consecutively addressed LBAs, the physical location of the strips is not typically physically consecutive. According to the RAID advisory board model, the strip size (number of blocks or LBAs contained in a strip) is constant for an entire array. Strip size may also be referred to as stripe depth or chunk size. Positionally corresponding strips on member disks of a striped array are collectively called a stripe. That is, for a group of member disks, such as disks 26 in FIG. 2, the first group of strips allocated to each disk 26, i.e. strips 0–5, are collectively referred to as a stripe and each disk 26a–26f is a member disk. Additionally however, in the example shown in FIG. 2, the second group of strips, i.e., strips 6–8, also comprise a stripe and only disks 26d–26f are member disks for that stripe.

FIG. 2 is an example of the physical placement of various LUN strips in the proportional disk mapping scheme of the present invention. Each of the disks 26a, 26b, 26c, 26d, 26e, and 26f are allocated a predetermined number of strips with respect to the remaining disks. That is, for each strip allocated to disk 26a, disk 26b is allocated one strip, disk 26c is allocated one strip, disks 26d and 26e are each allocated two strips, and disk 26f is allocated three strips. Thus for the six-disk example shown in FIG. 2, disks 26d, 26e and 26f provide proportionally larger shares of the physical disk space allocated for LUN 50 than disks 26a, 26b, and 26c. The module 52 manages this configuration, keeping track of the location of information that is collectively represented to the host as LUN 50.

The proportional mapping scheme is generally defined by a create statement provided by database administrator (DBA) wherein the create statement defines a list of member disks and the number of to be mapped to each of the member disks. In the example shown in FIG. 2, the create statement provides information as to the physical disks to be utilized, i.e., disks 26a–26f and the number of strips to be allocated to each physical disk, i.e., one, one, one, two, two, and three, respectively. Many other combinations as to the number of member disks and the number of strips allocated to the disks are foreseen, as FIG. 2 merely demonstrates an example of the proportional mapping technique. Allocating strips in a proportional manner, as illustrated in FIG. 2, provides flexibility to the DBA in balancing the collective load of numerous LUNs that share the various disks 26 in an array 24. In essence, this technique provides the DBA with a method of creating a LUN to take advantage of all available disk resource space.

Figure 3:
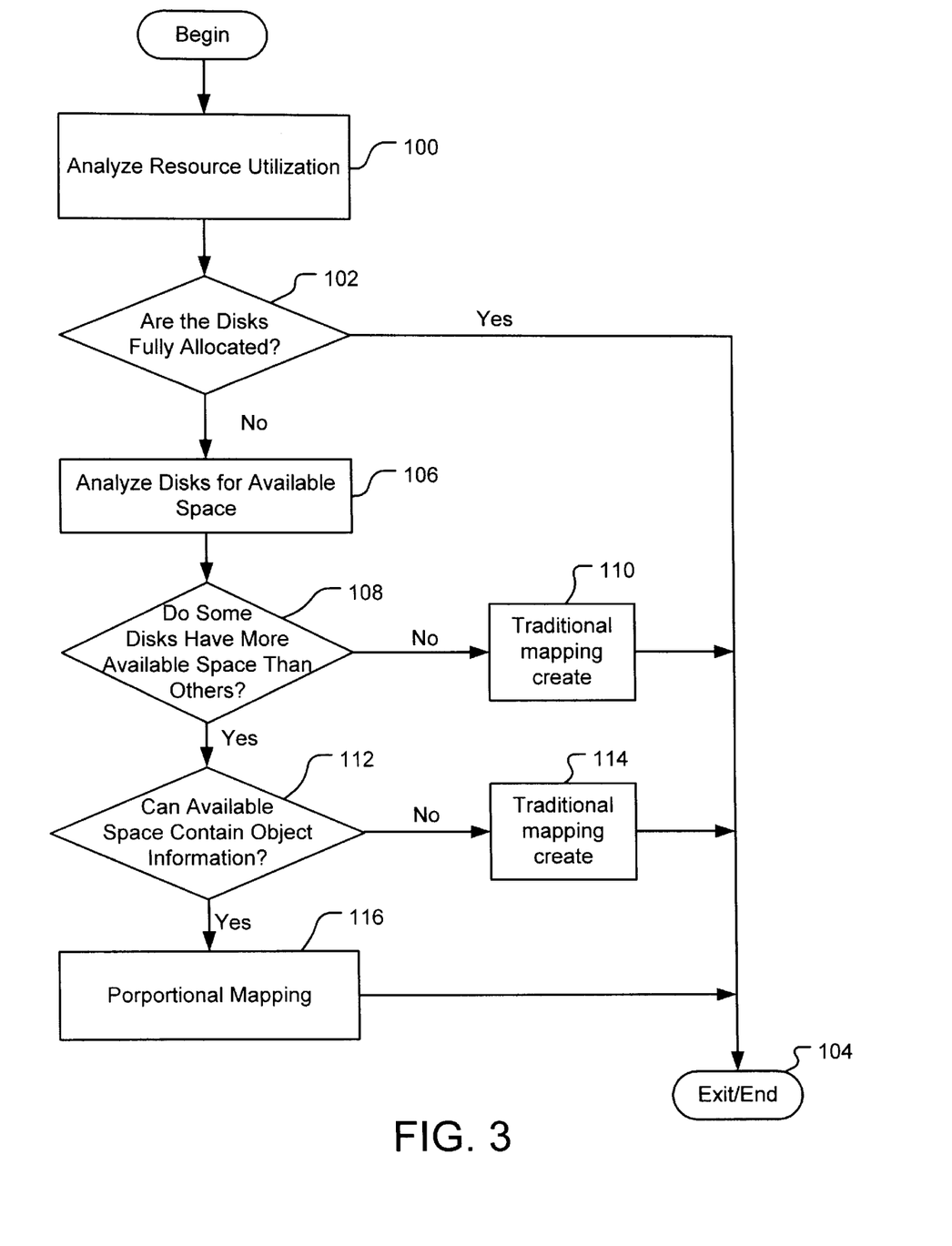
FIG. 3 is a process flow diagram representing the process of determining whether proportional mapping can be utilized for the RAID system shown in FIG. 1.

FIG. 3 is a process flow diagram representing the determination as to whether proportional mapping can and should be used for a particular LUN in a RAID system, such as system 20, (FIG. 1). This process is typically used for the creation of a new LUN, but could be used for the recreation of preexisting LUN. The testing process begins with analyze step 100, which analyzes the performance of the RAID system 20, including the I/O performance of the various disks and the relative concentration of disk access for each disk. Step 100 is accomplished using a system-monitoring tool that provides various I/O ratios and hit requests for the disks. The system-monitoring tool therefore provides information to the DBA as to whether a particular file, disk, group of disks or LUN is being accessed excessively and thus whether a load imbalance exists. Such monitoring tools are available through Windows NT and other third party vendors. The system DBA then analyzes the results of the system-monitoring tool to determine the degree of the load imbalance and whether reallocation might increase performance. Alternatively, the system-monitoring tool could be configured to measure the load imbalance and compare the results against predetermined thresholds and therefore automatically determine the degree of imbalance.

Assuming that the performance is less than optimal, the process flow proceeds to determination step 102. Determination step 102 determines whether the disks 26 are fully allocated. Software tools exist to determine whether disks are fully allocated and this step may be done automatically or by the DBA. In general, if the disks are fully allocated then proportional mapping is not an available option since there is no available disk space to utilize. That is, the proportional mapping seeks to map some of heavily used data to available disk space on disks that are not heavily used. If there is no such disk space, then proportional mapping is not an option. Thus, if the disks are fully allocated, then flow branches YES to exit/end step 104 and the process completes.

In another embodiment, the various LUNs could be analyzed to determine whether the recreation of more than one LUN using this procedure may increase performance. Thus, in that case even if the disks are fully allocated, proportional mapping may still be used. However, the overhead for such a procedure may outweigh the benefits since complex routines must be analyzed to provide possible placement solutions. Therefore the preferred method implements test operation 102 to determine whether the disks are fully allocated and exits at step 104 if the disks are fully allocated.

If test operation 102 determines that the disks are not fully allocated, then flow branches NO to analyze step 106, which determines which disks have available space and the amount of space available on these disks. This step may be accomplished by the same tools used at step 102 which determines whether the disks are fully allocated. Alternatively, a separate software tool can be used to generate a listing of the various disks in a system and the amount of available space on each disk. Analysis step 106 works in combination with the next step 108, which determines whether some disks have more available space than others, i.e., whether the disks are unequally allocated.

In general, step 108 determines whether some of the lightly used disks have a proportional amount of available space. Determination step 108 may compare available disk space against predetermined minimum threshold values or simply try and find the disks that have the most available disk space, depending on the degree of imbalance and the amount of available space. The determination step 108 however must determine whether the amount of available space is sufficient to enable a proportional mapping scheme. If it is determined that the available space is not sufficient to enable proportional mapping, then flow branches NO to process step 110 which is a traditional mapping create process step. The traditional mapping create step 110 provides for the creation of a LUN wherein each of the member disks are allocated equal portions of physical disk space for the LUN. Following the traditional mapping create process step 110, the process exits at step 104.

If determination step 108 determines that some disks have available space to allow for proportional mapping, flow branches YES to test operation 112. Test operation 112 tests the available space on the disks and analyzes that with respect to the object information or LUN data to be proportionally mapped to the available space on the disks, and whether the data can be located on the disk. That is, for various reasons, such as redundancy schemes or I/O performance issues, it is predetermined that some LUN data should not be placed on a physical disk that contains other predetermined information. For example, some LUNs are created that should not share physical disks with other LUNs. Therefore, test operation 112 compares the object information with the information already present on the physical disk containing available space (as determined at step 108) to ensure that the physical disk may contain the object information. Such a determination can be made from a predetermined lookup table or other testing schema.

If test operation 112 determines that the free space that would be used by the proportionally mapped LUN is located on a disk that has been predetermined to not contain the object information, then flow branches NO to step 114. Step 114 is a traditional mapping create process step similar to operation 110 discussed above wherein the LUN is created according to non-proportionally mapped algorithms. Following the traditional mapping create operation 114, the process flow continues to end step 104 and the process is completed.

If, at operation 112, it is determined that the free space may contain object information, flow branches YES to proportional mapping operation 116. Proportional mapping operation 116 creates a LUN having allocated physical disk space located in proportional amounts on various disks, such as the proportionally created LUN 50 shown in FIG. 2. Creating a LUN having more information on some disks as compared to other disks allows for the better placement of files on the disks to optimize I/O performance. As an example of the proportional mapping step 116, Table 1 illustrates the creation of proportionally mapped LUN having twenty segments or strips and the placement of those segments on six different member disks.

TABLE 1

| GROUP NUM | STRIPE NUM | Disk a | Disk b | Disk c | Disk d | Disk e | Disk f |
|---|---|---|---|---|---|---|---|
| 0 | 0 | 0 | 1 | 2 | 3 | 4 | 5 |
| 0 | 1 |   |   | 6 | 7 | 8 |   |
| 0 | 2 |   |   |   |   |   | 9 |
| 1 | 3 | 10 | 11 | 12 | 13 | 14 | 15 |
| 1 | 4 |   |   |   | 16 | 17 | 18 |
| 1 | 5 |   |   |   |   |   | 19 |

Therefore the mapping of segments from a virtual volume to physical disks, in response to a proportional create operation 116 is shown in Table 1. The exemplary create statement provided by the DBA listed the disks and the number of segments for each disk. For example, the statement that created the LUN in Table 1 requested that disks a, b, c, d, e and f be allocated 1, 1, 1, 2, 2 and 3 segments, respectively, for each group.

The results the mapping shown in Table 1 correspond to the creation of LUN 50 shown in FIG. 2 for the first twenty strips. Other create statements may be utilized to generate the mapping shown in Table 1. Table 1 illustrates that strip 0 and strip 10 of the LUN are mapping to or located on disk a. Thus, two strips of disk a are allocated to the LUN and information from strips 0 and 10 are located on disk a. Similarly, disk b receive strip 1 and strip 11; disk c contains strip 2 and strip 12; disk d contains strip 3, strip 6, strip 13 and strip 16; disk e contains strip 4, strip 7, strip 14, strip 17 and strip and disk f has the most strips 5, 8, 9, 15, 18 and 19. In essence, the array management module 52 (FIG. 2) provides that one strip is mapped to each disk during the first pass or stripe and then during the second stripe, strips are mapped only to those disks that have a "two" or higher integer and then for the third stripe, module 52 allocates a strip on those disks with an integer greater than the previous integer, etc. The process is repeated until all groups have been satisfied.

Figure 4:
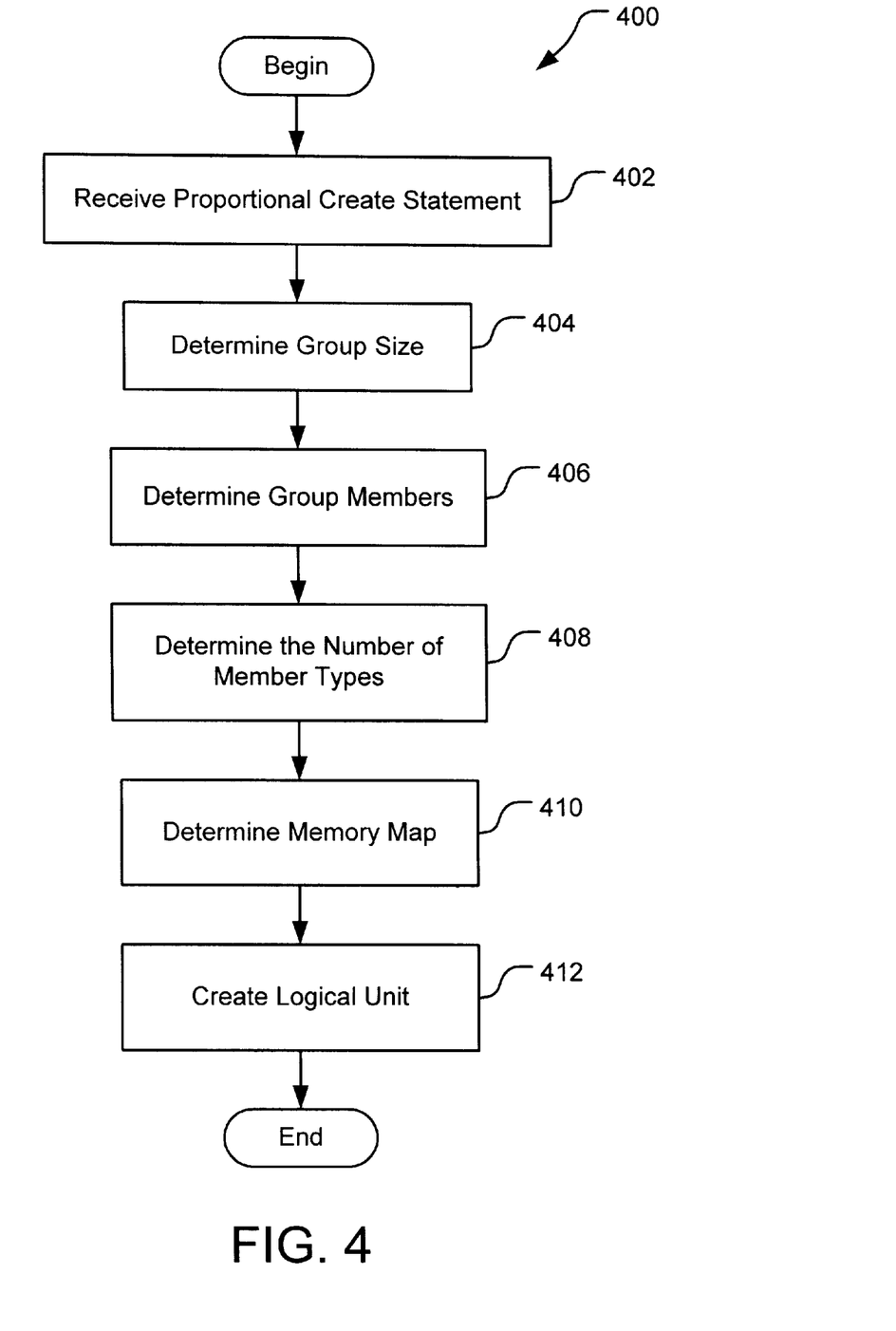
FIG. 4 is a process flow diagram representing the parsing of a proportional create request.

The proportional create operation 116, begins with a create statement that defines the proportional characteristics of the LUN. A flow diagram illustrating a parsing and creation process 400 for parsing the proportional create statement to create a proportionally mapped LUN in accordance with an embodiment of the present invention is shown in FIG. 4. During a first step 402 the process receives a create signal from the DBA. It should be noted that the DBA typically provides this information but it is foreseeable that an automated analysis tool could also provide a create statement of this nature. A create statement actually creates a LUN and therefore relates to the formatting of storage space among many disks, and thus it is preferable that a DBA determine when to create such a LUN. In an embodiment the DBA provides a statement that indicates which disks are to be striped and how many segments or strips each disk is to receive. The statement therefore has a parameter list of integers wherein each integer value relates to the number of segments a corresponding disk receives for each group. The number of groups relate to the overall amount of storage space to be allocated for a particular LUN, since the segment size is typically predetermined.

Following the receipt of the proportional create statement at step 402 the array management module then determines group size at step 404. Determining the group size requires a summation of the integers within the parameter list of the proportional create statement. In the above example displayed in Table 1, the group size was determined to be 10 because 10 is the sum of all integers in the parameter list. That is, 1+1+1+2+2+3=10. For each group in the LUN that is created, there will be 10 segments, e.g., strips. The number of groups for the LUN may be determined by taking the value of the overall allocation space and dividing by a value equal to the group size multiplied by segment size.

Following the determination of the group size at step 404 the create statement is then parsed to determine the group members value at operation 406. The group members value is an integer value equal to the number of disks within the create statement. In the above example shown in Table 1, the group members value is 6. The group members value relates more specifically to the actual physical disks that are used in the creation of this particular LUN. Although shown sequentially in Table 1, it may be that the actual mapping of segments to the disks are not in a sequential order. In such a case, temporary buffers may be set up to better parse the information provided in the create statement.

Following the determination of the group members value, the parsing process 400 then determines the number of member types at operation 408. The number of member types equals the number of unique values in the parameter list. In the above example, the number of member types equals "3" since there are three different unique values or integers associated with the group members.

Once the value for the number of member types has been determined at step 408, a memory map, similar to Table 1, is determined at operation 410. That is, the module 52 (FIG. 2) determines the mapping correlation for the strips in the LUN to the physical disks based on the parameters supplied in the create statement and the values determined at steps 404, 406 and 408. Using this memory map the module 52 then creates the LUN at step 412.

Figure 5:
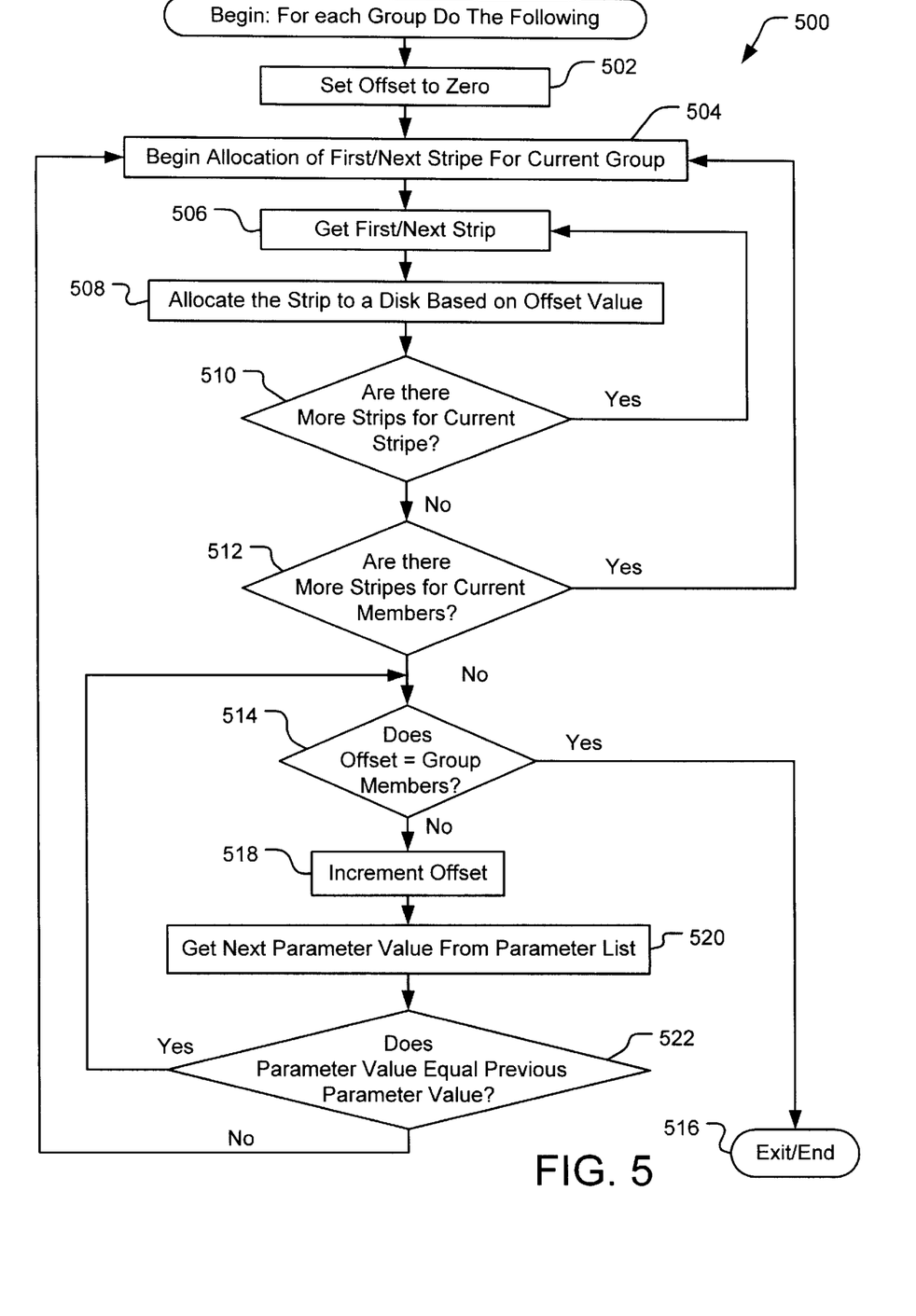
FIG. 5 is a process flow diagram representing the proportional creation of a LUN.

The details of operation 410 are shown in FIG. 5 which illustrates mapping process 500 that creates a proportional map in accordance with the present invention. The process 500 is repeated for each group in the LUN. The process begins at step 502 wherein an offset variable is set to zero. This offset variable is used by the process 500 at various times during the creation of the memory map process 500 and is set to zero at the very beginning at step 502 for each group.

Once the offset variable has been set to zero at step 502, process step 504 begins the allocation for the first stripe that is to be allocated for the current group. Step 504 essentially begins the allocation the first stripe for the current group. This step is later repeated as later stripes are allocated. Begin step 504 may also increment a counter as the stripe is allocated, as some proportional create statements may require several stripes be created for the current group members value as discussed below with respect to operation 512.

Once allocation for the first stripe has begun at step 504, process get step 506 begins the allocation of the first strip. Get step 506 gets or determines the first strip to be allocated for the LUN. Following get step 506, allocate operation 508 allocates the strip that was determined at step 506 to a particular physical disk, such as disk a in Table 1. The allocation of the strip to a disk is based on the value of the offset, wherein the disk that is allocated the strip is the first disk in the parameter list when the value of the offset is equal to zero. Therefore, during the first pass, since the offset value is zero the first disk indicated in the create statement, i.e., disk a, receives the first strip. If, for example, the value of the offset is equal to one, then the first disk to receive a strip would be disk b.

Following allocation of the strip at step 508 determination step 510 determines whether there are more strips for the current stripe. If there are more strips to be allocated for the current stripe, then flow branches is YES to get operation 506. Additionally, a counter is incremented, wherein the counter relates to the physical disk that is to be allocated a strip. Operation 506 then gets or determines the next strip value. This step is similar to the determination of the first strip value discussed above.

Following the determination of the next strip value allocation process 508 allocates the strip to a disk based on the offset value and the counter value. In this case the allocation of the strip increments to the next disk member beginning with the offset value. Once allocation of the next strip is complete at step 508, flow branches to determination step 510 to determine whether there are more strips for the current stripe Thus, determination step 510 determines whether the current stripe has been completed.

The steps 506, 508 and 510 continue until no more strips are to be allocated for the current stripe. Once no more strips are to be allocated for the current stripe, flow branches NO from determination step 510 to determination step 512. Determination step 512 determines whether there are more stripes that should be allocated for the current members. If, for example, each of the disks for the current group of member disks is to receive more than one strip for the current group then determination step 512 determines that at least one more strip must be allocated to the current starting member disk. The current starting member disk is the first member disk based on the offset value. If there are more stripes for the current member as determined by determination step 512 flow branches YES back to step 504. Step 504 then begins the allocation for the next stripe for the current group as discussed above executing steps 506, 508 and 510 until all strips for the next stripe are allocated.

As an example, a create statement that requires that each disk receive at least two strips for each group may cause determination step 512 to return to step 504. The group members value is not updated because all the disks are to receive another strip.

If determination step 512 determines that there are no more stripes for the current members to be allocated, flow branches NO to determination step 514. Determination step 514 checks to see if there are more parameters in the parameter list. In an embodiment of the invention, this test requires a simple comparison of the offset value to the group members value as determined at step 406 (FIG. 4) discussed above. If the offset value equals the number of group members then flow branches YES to 516 and the process is complete. Process step 516 is the exit/end step returning an acknowledgment to the user or DBA that the LUN has been proportionally created.

If the offset does not equal the group members, as determined in step 514, then there are more stripes to be allocated for the current group. Since there are more stripes to be allocated for the current group then the next set of disks must be determined that will receive the next stripe in the current group. Therefore flow branches NO to step 518 where the offset value is incremented 518. Step 518 increments the offset value. Following operation 518, step 520 gets the next parameter value from the parameter list. Once the next parameter value from the parameter list,has been received at 520 flow branches to test operation 522 which tests the new parameter value (from 520) against the previous parameter value. If the new parameter value equals the previous value then flow branches YES to increment offset.

That is, if the parameter value equals the previous parameter value then this particular disk has received or been allocated all of the necessary strips and the offset must be incremented to effectively skip this disk during the next striping process.

Once the increment offset step 518 is complete, flow branches to 520 and then to 522 until a parameter value is received that does not equal the previous parameter value. Once a parameter value is received that does not equal the previous parameter value then flow branches NO from test operation 522 to step 504. Since a new offset value has been determined each new stripe allocated is a different size and only some of the original disks provide space to the next stripe. The stripe size essentially begins with the offset value disk and ends with the last disk in the parameter value list. Since step 512 only requires information based on the first member decrementing the value of the group members is not necessary. Moreover, since step 514 depends on the original value of the group members, this value should not change.

Step 504 then begins the process of allocating the next stripe repeating process steps 506, 508, and 510 until the stripe is complete. Once the stripe is complete, determination step 512 determines whether another stripe must be allocated for the current group of members. If so, flow branches back to 504 and the process repeats.

The process steps described above repeat until step 514 receives a value wherein offset value equals the value of the group members since each time the value is incremented a test is done to determine whether or not the offset equals group members. Eventually the determination step 514 will determine that all strips have been allocated and the process flows to step 516 which causes the end of the mapping process. The process described above repeats until all groups for the LUN have been allocated. The proportional create statement causes the creation of a LUN of typically of N megabytes and the number of groups to be allocated depends on the overall amount of space to be allocated. Once all the space has been mapped by process 500, the LUN has been created and information can then be stored to the available space.

Process 500 is typically used to allocate the segments directly. In essence, the "memory map" may be simply the process code that executes process 500 and by which a segment is located on a particular disk. Alternatively, an extensive map or table can be generated and stored as a lookup table. However, in order to preserve memory, a preferred embodiment uses the above steps during the allocation and no extensive one-to-one table is kept in memory. For illustration purposes, Table 1 is provided as an exemplary table of segment allocation according to the present invention and may considered the result the memory mapping process described above. Although the table is not generated by a preferred embodiment, it is provided herein as an illustration as to the effect of proportional mapping.

Figure 6:
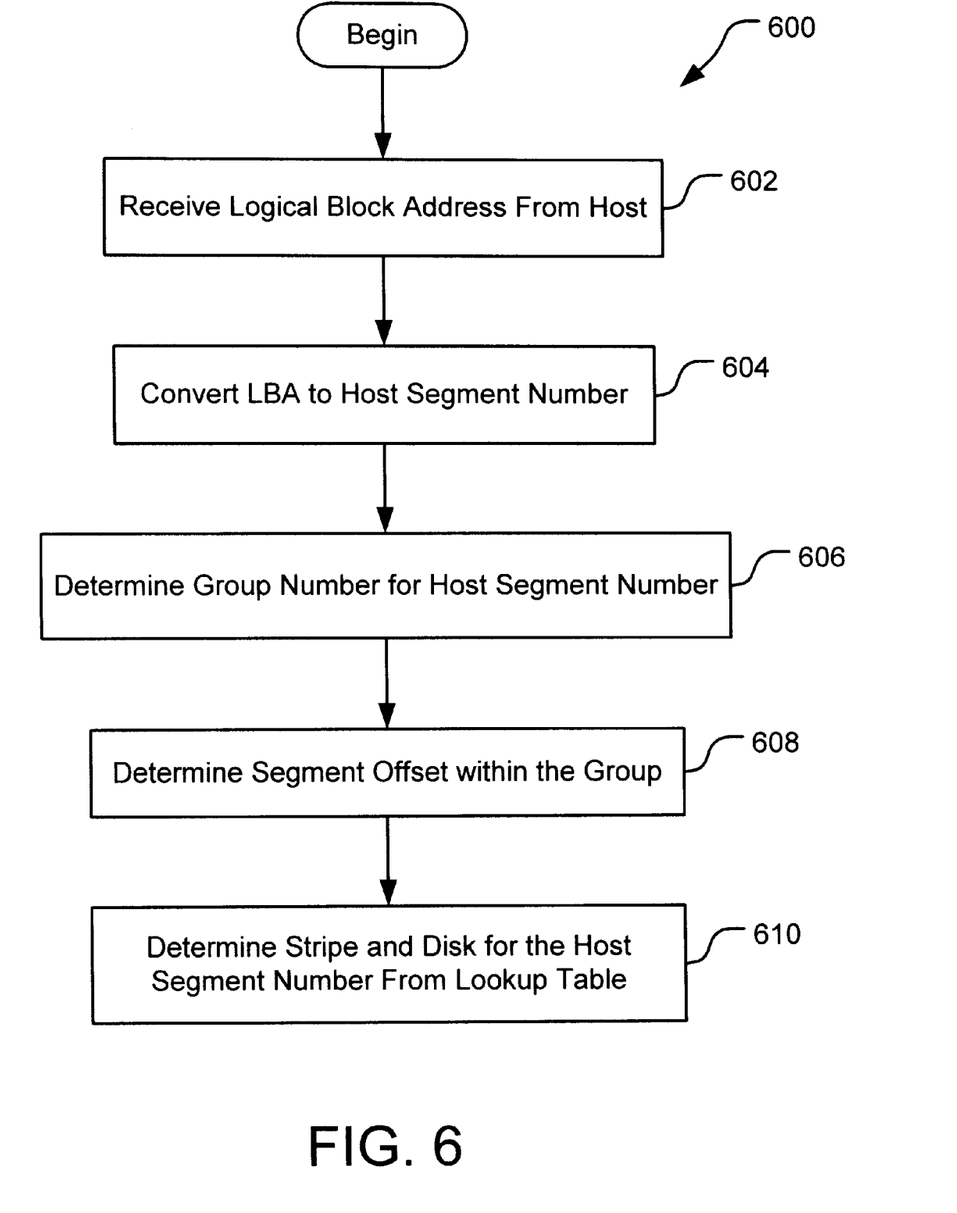
FIG. 6 is a process flow diagram use of a proportionally created LUN.

FIG. 6 illustrates the process of converting a logical block address to a segment number wherein segment number is a part of a proportionally mapped LUN. The proportionally mapped LUN was created substantially according to the algorithm described above with respect to FIG. 5. The process begins at 602 with the receipt of the logical block address from the host. Essentially, since the host views a virtual volume, such as virtual volume 50 shown in FIG. 1, the host uses logical block addresses to address specific files and sends an access request for a file or data and includes a logical block address to locate that portion of the file.

In order to access the information, the logical block address must be converted into a physical address relating to the disk that contains that particular portion of data. The logical block address, since it is sequentially allocated for the virtual volume, relates to a segment or strip number. Step 604 converts the LBA to one of the host strip numbers, such as one of the numbered strips shown in FIG. 2. Converting step 604 is a straightforward translation from an address to a strip number, typically using a lookup table of information for all the strip numbers and the LBAs within each strip.

Once the LBA has been converted a host strip number, determination step 606 determines the group number for that host strip number. Determining the group number for the host strip number generally requires the division of the strip number divided by the group size. The group size for each LUN is predetermined and stored in the look up table. Therefore, the determination of the group number for the host strip number is a straightforward mathematical calculation of dividing the host strip number by the group size.

Once the group number has been determined at 606, determination step 608 determines the segment offset within the group. Determining the segment offset within the group generally requires a mathematical calculation of determine the segment modulus group size. Segment modulus group size, essentially, means that the group size value is divided by the strip number, and the remainder equals the modulus. This modulus offset into the particular group that contains the host strip number.

The next step, step 610, determines the stripe and disk for the host strip number from a look-up table. Using the disk offset value a simple look-up table can be accessed and provide the actual disk and the actual stripe for that host segment number. This look-up table was created during or sometime after the creation of the LUN. For the proportionally created LUN example described in FIG. 2 and in Table 1, the following look up table was created.

TABLE 2

| SEGMENT OFFSET | RELATIVE STRIPE | DISK |
|---|---|---|
| 0 | 0 | a |
| 1 | 0 | b |
| 2 | 0 | c |
| 3 | 0 | d |
| 4 | 0 | e |
| 5 | 0 | f |
| 6 | 1 | d |
| 7 | 1 | e |
| 8 | 1 | f |
| 9 | 2 | f |

Table 2 illustrates the relative stripe and disk for each strip given the offset, which was determined at step 608. Using the relative stripe and disk value, the precise data can be accessed from the physical disk. Once the physical data can be obtained, read or written, the algorithm is complete.

The present invention provides a method and means for creating a proportionally mapped LUN. The ability to proportionally create LUNs provides a DBA the ability to fine tune a RAID system by allowing files to be allocated across disks in any number of combinations. Modifying the location of files across the different disks allows the DBA to increase input/output performance for the system.

While the invention has been particularly shown and described with reference to preferred embodiments thereof, it will be understood by those skilled in the art that various other changes in the form and details may be made therein without departing from the sprit and scope of the invention.

As an example, the present invention may be embodied as a method, apparatus, computer storage medium or propagated signal containing a computer program for the creating and managing the proportional mapping of disk space for a LUN.

What is claimed is:

1. A method of creating a logical unit in a redundant array of independent disks system having a plurality of disks wherein the method comprises:

dividing the logical unit into a plurality of segments;

allocating at least one segment to a first disk and at least one segment to a second disk of the plurality of disks;

allocating at least one additional segment to the second disk, and wherein the second disk is allocated proportionally more segments that the first disk; and receiving a proportional create statement wherein the create statement defines at least one logical unit comprising a predefined number of groups and contains a parameter list of disks and the number of segments to be allocated to each disk for each said group.

2. A method as defined in claim 1 further comprising a parsing step to determine a group size value and a group members value.

3. A method as defined in claim 2 further comprising:

generating a memory map indicating the corresponding disk for each segment; and accessing data in the logical unit according to the memory map.

4. A method of improving the performance of a redundant array of independent disks system wherein the system comprises a plurality of disks and at least one logical unit associated with disk space on less than all of said disks, said method comprising:

analyzing the utilization of the plurality of disks, including hit-rate for each disk;

determining the availability of disk space;

determining whether the available disk space can contain new information; and creating a new logical unit using proportional mapping wherein:

at least some information from the new logical unit is stored on the disks previously determined to have available space; and at least one disk is allocated more segments for the new logical unit than another disk having at least one segment for the new logical unit.

5. A method as defined in claim 4 wherein step of creating a new logical unit comprises the following:

receiving a proportional create statement;

parsing the create statement to determine a value relating to a group size and a value relating to the group members;

allocating strips of the logical unit to the physical disks indicated in the create statement according to the proportions indicated in the create statement.

6. A method as defined in claim 5 wherein the step of allocating strips of the logical unit to the physical disks comprises the following:

creating a memory map for the segments in the logical unit and the corresponding disks;

allocating the segments for the logical unit according the memory map.

7. A method as defined in claim 6 wherein the step of creating a memory map comprises the following:

determining characteristics for a first stripe of strips, wherein the characteristics relate to which physical disks receive the first stripe of strips;

allocating strips for the first stripe to the disks;

determining the characteristics for at least one additional stripe of strips wherein the characteristics for the additional stripe of strips differs from the characteristics associated with the first stripe.

8. A method as defined in claim 7 further comprising the step of creating a conversion memory map for converting logical block addresses to physical addresses.

9. A redundant array of independent disks system comprising:

a plurality of disks forming an array;

a controller connected to the array of disks for controlling the allocation of data on the physical disks;

a host computer system connected to the controller, wherein the information on the array is presented to the host system as one or more virtual disks;

a module associated with the controller for proportionally mapping virtual disk information to the array;

a parsing module for parsing a proportional create statement wherein the proportional create statement indicates the disks to receive strips of the virtual disk and the relative proportions for each disk;

an allocation module for allocating strips of the virtual disk to the physical disks indicated in the create statement in the indicated proportions; and a conversion module for converting logical block addresses into physical disk addresses.

* * * * *